(12) United States Patent
Cho et al.

(10) Patent No.: US 9,223,014 B2
(45) Date of Patent: Dec. 29, 2015

(54) THREE DIMENSIONAL RADAR SYSTEM USING USUAL RADARS INSTALLED IN SEA FACILITIES

(75) Inventors: Deuk Jae Cho, Daejeon (KR); Sang Hyun Suh, Chungcheongnam-do (KR)

(73) Assignee: Korea Institute of Ocean Science & Technology, Gyeonggi-do (KR)

( * ) Notice: Subject to any disclaimer, the term of this patent is extended or adjusted under 35 U.S.C. 154(b) by 188 days.

(21) Appl. No.: 14/125,358

(22) PCT Filed: Mar. 16, 2012

(86) PCT No.: PCT/KR2012/001904
§ 371 (c)(1),
(2), (4) Date: Dec. 11, 2013

(87) PCT Pub. No.: WO2012/176969
PCT Pub. Date: Dec. 27, 2012

(65) Prior Publication Data
US 2014/0118183 A1 May 1, 2014

(30) Foreign Application Priority Data

Jun. 24, 2011 (KR) .................. 10-2011-0061719

(51) Int. Cl.
| | |
|---|---|
| *G01S 13/87* | (2006.01) |
| *G01S 13/06* | (2006.01) |
| *G01S 13/72* | (2006.01) |
| *G01S 13/02* | (2006.01) |

(Continued)

(52) U.S. Cl.
CPC . *G01S 13/02* (2013.01); *G01S 7/03* (2013.01); *G01S 13/426* (2013.01); *G01S 13/87* (2013.01); *H01Q 1/34* (2013.01); *H01Q 3/02* (2013.01); *H01Q 3/26* (2013.01); *H01Q 21/28* (2013.01)

(58) Field of Classification Search
CPC ............. G01S 7/02; G01S 7/03; G01S 13/02; G01S 13/06; G01S 13/42; G01S 13/426; G01S 13/87; G01S 13/424; G01S 13/66; G01S 13/68; G01S 13/70; G01S 13/72; G01S 13/88; G01S 13/882; H01Q 1/27; H01Q 1/34; H01Q 3/02; H01Q 3/26; H01Q 21/28
USPC ........... 342/27, 28, 59, 73–81, 118, 123, 146, 342/147, 175, 195, 120–122
See application file for complete search history.

(56) References Cited

U.S. PATENT DOCUMENTS 2,602,923 A * 7/1952 Frazier ............................ 342/59
2,939,134 A * 5/1960 Atta ................................ 342/59

(Continued)

FOREIGN PATENT DOCUMENTS

KR 10-1994-0023259 A 10/1994
KR 10-2003-0032210 A 4/2003

(Continued)

*Primary Examiner* — Bernarr Gregory
(74) *Attorney, Agent, or Firm* — Rabin & Berdo, P.C.

(57) ABSTRACT

There is provided a three-dimensional radar system by using the combination of commercialized usual radars for vessels at relatively low price so as to enable to strengthen the surveillance capability about aircrafts flying at low altitude and strengthen the surveillance capability on the sea and in the air to protect important facilities of a port with more developed than the conventional surveillance system of monitoring only ships or vessels in a port while overcoming the operational limitation of VTS (Vessel Traffic Service).

4 Claims, 7 Drawing Sheets

(51) Int. Cl.
*G01S 7/03* (2006.01)
*H01Q 1/34* (2006.01)
*H01Q 3/26* (2006.01)
*H01Q 21/28* (2006.01)
*G01S 13/42* (2006.01)
*H01Q 3/02* (2006.01)
*G01S 13/00* (2006.01)

(56) References Cited

U.S. PATENT DOCUMENTS

| | | | | |
|---|---|---|---|---|
| 3,064,252 | A * | 11/1962 | Varela | 342/123 |
| 3,070,795 | A * | 12/1962 | Chambers | 342/147 |
| 3,161,870 | A * | 12/1964 | Pincoffs | 342/59 |
| 3,184,739 | A * | 5/1965 | Franklin et al. | 342/59 |
| 3,214,755 | A * | 10/1965 | Blass et al. | 342/123 |
| 3,274,593 | A * | 9/1966 | Varela et al. | 342/147 |
| 3,311,913 | A * | 3/1967 | Varela | 342/123 |
| 3,448,450 | A * | 6/1969 | Alfandari et al. | 342/123 |
| 3,971,020 | A * | 7/1976 | Howard | 342/123 |
| 4,333,077 | A * | 6/1982 | Teilhet | 342/59 |
| 4,751,511 | A * | 6/1988 | Komata et al. | 342/59 |
| 5,341,141 | A | 8/1994 | Frazier et al. | |
| 5,381,156 | A * | 1/1995 | Bock et al. | 342/59 |
| 5,410,314 | A * | 4/1995 | Frush et al. | 342/59 |
| 5,410,316 | A * | 4/1995 | Brooks | 342/59 |
| 6,064,331 | A * | 5/2000 | Avila et al. | 342/59 |
| 6,249,241 | B1 * | 6/2001 | Jordan et al. | 342/59 |
| 6,697,012 | B2 * | 2/2004 | Lodwig et al. | 342/118 |
| 6,977,610 | B2 * | 12/2005 | Brookner et al. | 342/59 |
| 7,167,126 | B2 * | 1/2007 | Wittenberg et al. | 342/123 |
| 7,358,892 | B2 * | 4/2008 | Thome et al. | 342/175 |
| 7,518,543 | B2 * | 4/2009 | Herberthson | 342/59 |
| 7,940,206 | B2 * | 5/2011 | Nohara et al. | 342/59 |

FOREIGN PATENT DOCUMENTS

| | | |
|---|---|---|
| KR | 10-2008-0086714 A | 9/2008 |
| KR | 10-0902559 B1 | 6/2009 |

* cited by examiner

FIG. 1

(PRIOR ART)

FIG. 2

(PRIOR ART)

FIG. 3

(PRIOR ART)

FIG. 6 height detect

FIG. 7

81 82 83 84 azimuth detect
    80

THREE DIMENSIONAL RADAR SYSTEM USING USUAL RADARS INSTALLED IN SEA FACILITIES

TECHNICAL FIELD

The present invention relates to a three dimensional radar system using radars for vessels to enable to perform port and air surveillance.

BACKGROUND ART

VTS (Vessel Traffic Service), which is used to make, arrange, and control overall traffic system projects such as sailing speed, course, directions, and location positioning about all vessels coming in and out of a port within a range of sea, employs a port radar to identify and trace ships and vessels in a port.

Figure 1:
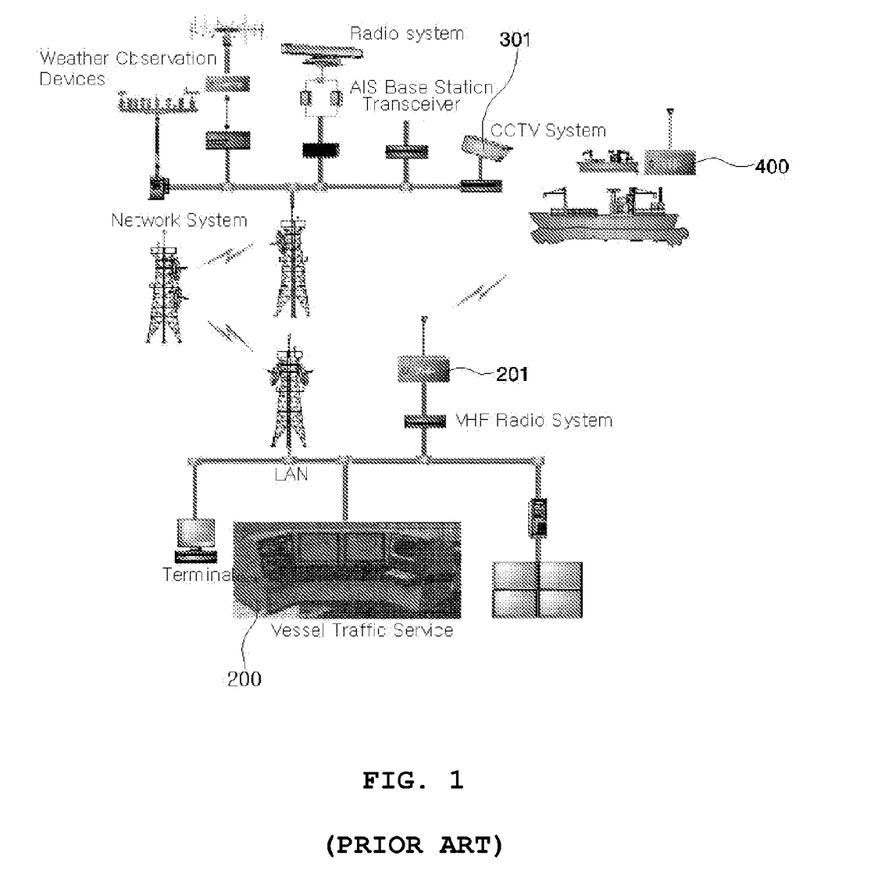
FIG. 1 is a schematic view of a conventional VTS (Vessel Traffic Service) system.

As illustrated in FIG. 1, a VTS (200) employs a CCTV (301), a VHF (201), communication devices, and so on in order to control the vessels sailing in the radar-monitoring incapable sea areas and identify the clearness of the vessels. However, any appliances could not be realized to monitor and acquire any information about the aircrafts flying through the air near ports.

Further, when error occurs in the system due to the radar after-image of the aircraft approaching the port, damages may be anticipated in private vessels because port surveillance and control cannot operate in appropriate time. However, huge amount of expenses is required to install air radar system for air surveillance and control at the same time.

In view of domestic and foreign related technology and particularly, domestic related technology present conditions, air surveillance system in operation at present is provided mainly according to sea coast and air surveillance and long and middle distances air surveillance, and these systems are suitable for manned aircrafts and missile defense purposes. There is not yet developed the system suitable for surveillance of small-sized unmanned aircrafts in the short distance and close ranges air.

Infratechnology such as radar video signal processing technology and data processing technology has been rapidly developed mainly with domestic defense industry, but is still beginning status compared with advanced countries, and could not be developed into civil industrialization because most of domestic radar technology has been treated as military security technology.

As the radar system being used for air surveillance and control is mainly for military purposes, precise data is used, and the surveillance ranges is very wide up to hundreds of kilometer. The air surveillance radar system for military purposes as above is difficult to use in a narrow range for air surveillance and control, and is very expensive equipment raging from billions of won to tens of billions of won in price.

In view of the domestic and foreign related technology and the radar manufacturing, the main manufacturers of the global radar system for port surveillance and control are NOR-CON and ATRAS Corporation, and the radar systems from these manufacturers are domestically installed and in operation in VTS sites, but mostly used for vessel surveillance and control only on the sea.

Figure 2:
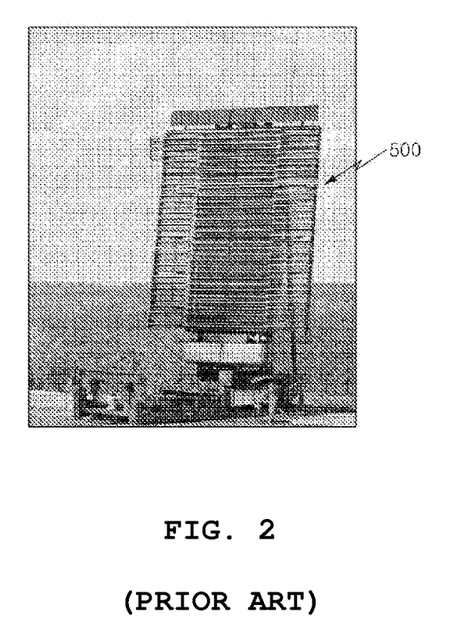
FIG. 2 is a view of an AN/TPS-77 of the Lockheed Martin Corporation.

As illustrated in FIG. 2, an AN/TPS-77 (500) from the Lockheed Martin Corporation being used in the US Armed Forces is a long distance movable air surveillance system, and monitors the air at the surveillance radius of 460 Km and at the altitude up to 30 Km. This system is now used in about 20 countries including Korea, and is very expensive equipment at price of about 15 billion won.

Figure 3:
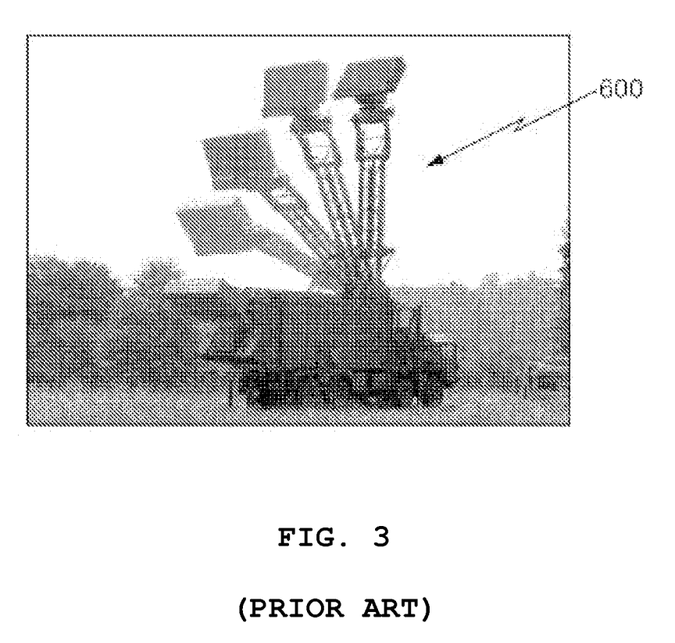
FIG. 3 is a view of a TRML-3D of the EADS Corporation of France.
Figure 4:
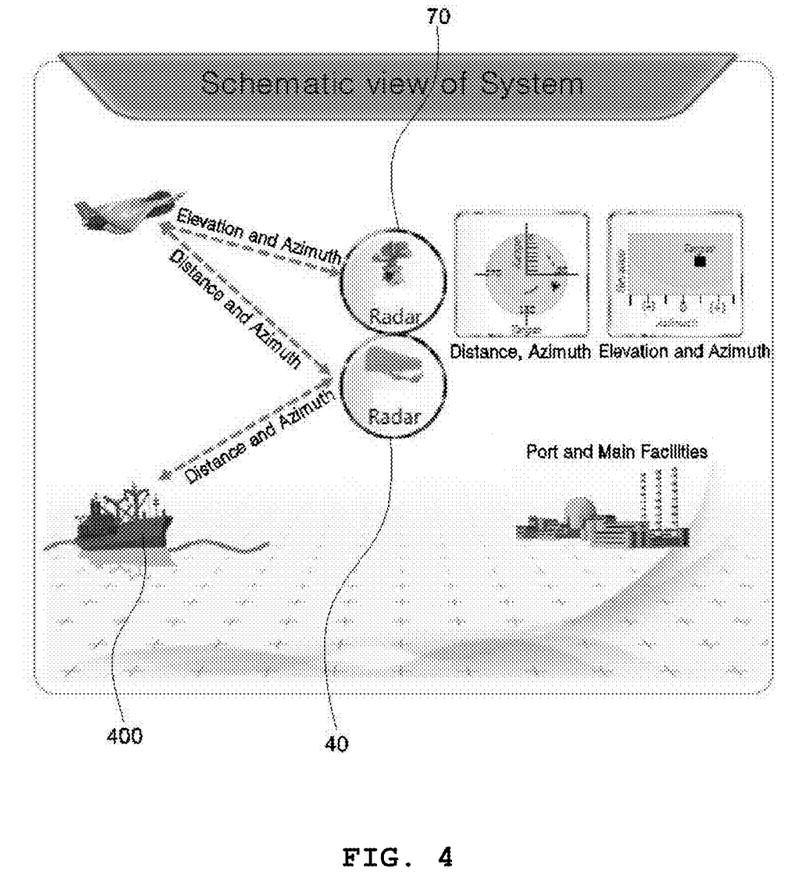
FIG. 4 is a view showing usage examples of a three-dimensional radar system using usual radars according to the present invention.

As illustrated in FIG. 3, a TRML-3D radar system (600), a movable surveillance system developed in the EADS Corporation of France is known to have the high surveillance capability.

Foreign advanced countries such as the USA, France, Japan, etc. have developed many air surveillance radar systems in wide purposes and employed in the military purposes equipment.

DISCLOSURE

Technical Problem

The present invention has been made to overcome the operational limitation of the VTS (Vessel Traffic Service) as aforementioned, and it is an aspect of the present invention to provide a three dimensional radar system by using the combination of commercialized usual radars at relatively low price for vessel surveillance to be more developed than the conventional system of monitoring only ships or vessels in a port, and to be capable of monitoring aircrafts flying at low altitude with strengthened capability of sea and air surveillance to protect important facilities inside a port.

Technical Solution

In accordance with the present invention, the above and other aspects can be accomplished by providing a three dimensional radar system using usual radars installed in sea facilities comprising: an azimuth detect device comprising at least two azimuth detect radars for detecting the azimuth of a target in the air and the sea by emitting microwaves, an azimuth detect radar module including the azimuth detect radars vertically sequentially aligned with a space with different azimuth detect angles from each other, and an azimuth detect rotation module for supporting and rotating the azimuth detect radars; a height detect device comprising a height detect radar vertically provided and detecting the altitude of the target by emitting microwaves, and a height rotation module for supporting and rotating the height detect radar; and a control device for controlling the azimuth detect device and the height detect device, in which the control device includes the operation of positioning the height detect radar to detect the altitude of the target by using the height rotation module after the azimuth detect device detects the azimuth of the target.

In accordance with the present invention, the above and other aspects can be accomplished by providing a three dimensional radar system using usual radars installed in sea facilities comprising: an azimuth detect device comprising an azimuth detect radar for detecting the azimuth of a target in the air and the sea by emitting microwaves, a tilting member for controlling the horizontal angle of the azimuth detect radar, and a horizontal rotation module for rotating the azimuth detect radar and the tilting member; a height detect device comprising a height detect radar vertically provided and detecting the altitude of the target by emitting microwaves, and a height rotation module for supporting and rotating the height detect radar; and a control device for controlling the azimuth detect device and the height detect device, in which the control device includes the operation of positioning the height detect radar to detect the altitude of the target by using the height rotation module after the azimuth detect device detects the azimuth of the target.

The radiation ranges of the azimuth detect radar and the height detect radar may be 15° or higher than 15° and lower than 30°, or may be identical to that of the commercialized usual radar for vessels, 22°.

Further, according to the present invention, the azimuth detect devices and the height detect device are installed in a sea facility, and the radar system of the present invention may further comprise a communication device for communicating and sharing the information of the target in the air and the sea with other sea facilities.

Advantageous Effects

As described above, in accordance with the present invention, it is possible to realize fast response management for emergency cases in main ports and adjacent seas and the ports security control services.

Further, in accordance with the present invention, it is possible to establish integrated air surveillance systems by the air surveillance system networks in main areas and through the connection and communication of these surveillance system networks.

Further, in accordance with the present invention, it is possible to maintain at low price the surveillance radar system built up by using usual radars at low price.

Further, in accordance with the present invention, it is possible to maximize mutual synergy effect through the connections with related industries.

DESCRIPTION OF DRAWINGS

These and other aspects and advantages of the present invention will become apparent and more readily appreciated from the following description of the embodiments, taken in conjunction with the accompanying drawings, in which.

BRIEF DESCRIPTION OF REFERENCE NUMBERS OF MAJOR ELEMENTS

10: azimuth detect radar 11: antenna
12: rotating part 20: azimuth detect radar module
30: azimuth detect rotation module
40, 40': azimuth detect devices
50: height detect radar
60: height detect rotation module
70: height detect device
80: tilting member
90: control device

BEST MODE

The present invention to achieve the above aspects has the characteristics as follows:

In accordance with an embodiment of the present invention, there is provided a three-dimensional radar system using usual radars installed in sea facilities comprising: an azimuth detect device (40) comprising at least two azimuth detect radars (10) for detecting the azimuth of a target in the air and the sea by emitting microwaves, an azimuth detect radar module (20) including the azimuth detect radars (10) vertically sequentially aligned with a space with different azimuth detect angles from each other, and an azimuth detect rotation module (30) for supporting and rotating the azimuth detect radars (10); a height detect device (70) comprising a height detect radar (50) vertically provided and detecting the altitude of the target by emitting microwaves, and a height rotation module (60) for supporting and rotating the height detect radar (50); and a control device (90) for controlling the azimuth detect device (40) and the height detect device (70), wherein the control device (90) includes the operation of positioning the height detect radar (50) to detect the altitude of the target by using the height rotation module (60) after the azimuth detect device (40) detects the azimuth of the target.

In accordance with another embodiment of the present invention, there is provided a three-dimensional radar system using usual radars installed in sea facilities comprising: an azimuth detect device (40') comprising an azimuth detect radar (10) for detecting the azimuth of a target in the air and the sea by emitting microwaves, a tilting member (80) for controlling the horizontal angle of the azimuth detect radar (10), and a horizontal rotation module (87) for rotating the azimuth detect radar (10) and the tilting member (80); a height detect device (70) comprising a height detect radar (50) vertically provided and detecting the altitude of the target by emitting microwaves, and a height rotation module (60) for supporting and rotating the height detect radar (50); and a control device (90) for controlling the azimuth detect device (40') and the height detect device (70), wherein the control device (90) includes the operation of positioning the height detect radar (50) to detect the altitude of the target by using the height rotation module (60) after the azimuth detect device (40') detects the azimuth of the target.

MODE FOR INVENTION

The present invention will now be described more fully hereinafter with reference to the accompanying drawings, in which preferred embodiments of the invention are shown.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

As used herein, the singular forms "a", "an" and "the" are intended to include the plural forms as well, unless the context clearly indicates otherwise.

The present invention may be embodied in different forms and should not be construed as limited to the embodiments set forth herein. Rather, these embodiments are provided as teaching examples of the invention. Therefore, it will be understood that the scope of the invention is intended to include various modifications and alternative arrangements within the capabilities of persons skilled in the art using presently known or future technologies and equivalents.

Figure 6:
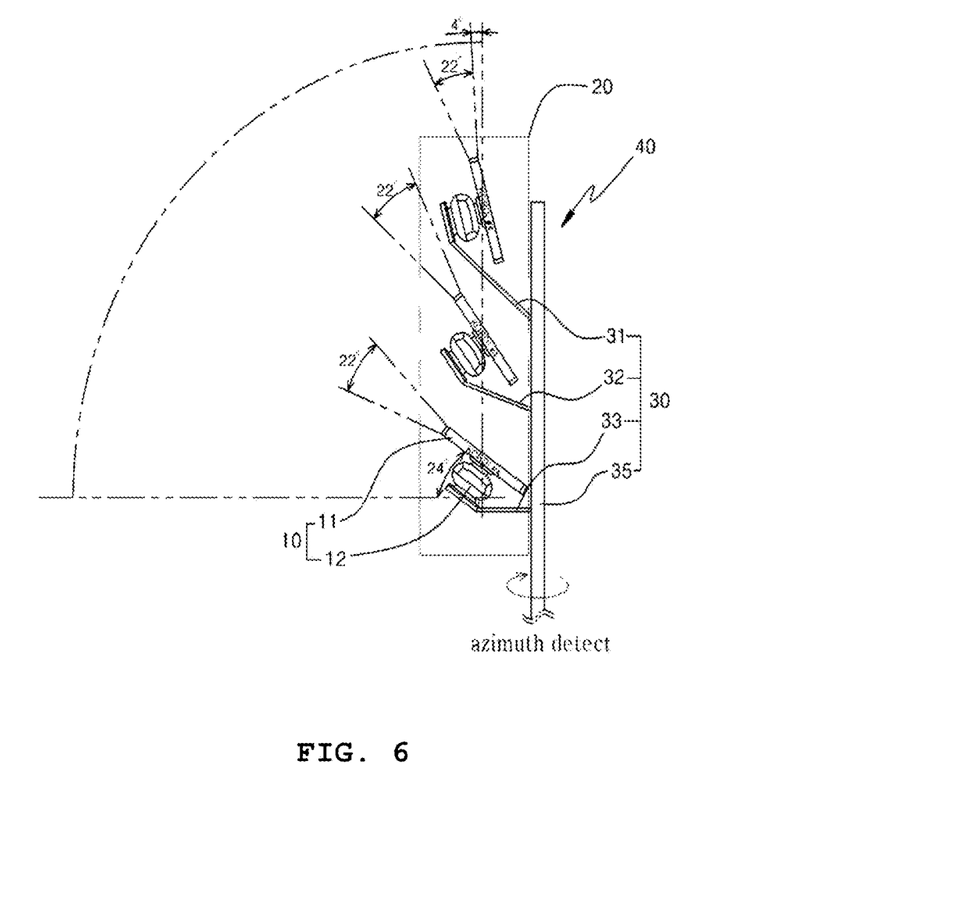
FIG. 6 is a configuration view showing an azimuth detect device according to an embodiment of the present invention.

A three dimensional radar system according to the present invention comprises a device for detecting an object in azimuth, a device for detecting an object in elevation, a device for controlling the system, and a communication device. The device for detecting an object in azimuth, which will be referred to as an azimuth detect device hereinafter, is divided into two types. One of them is an azimuth detect device (40) as illustrated in FIG. 6. The azimuth detect device (40) comprises an azimuth detect radar module (20) which includes at least two azimuth detect radars (10) sequentially aligned with a space from each other and respectively have different azimuth detect angles, and an azimuth detect rotation module (30) which supports and rotates the azimuth detect radars (10).

Figure 8:
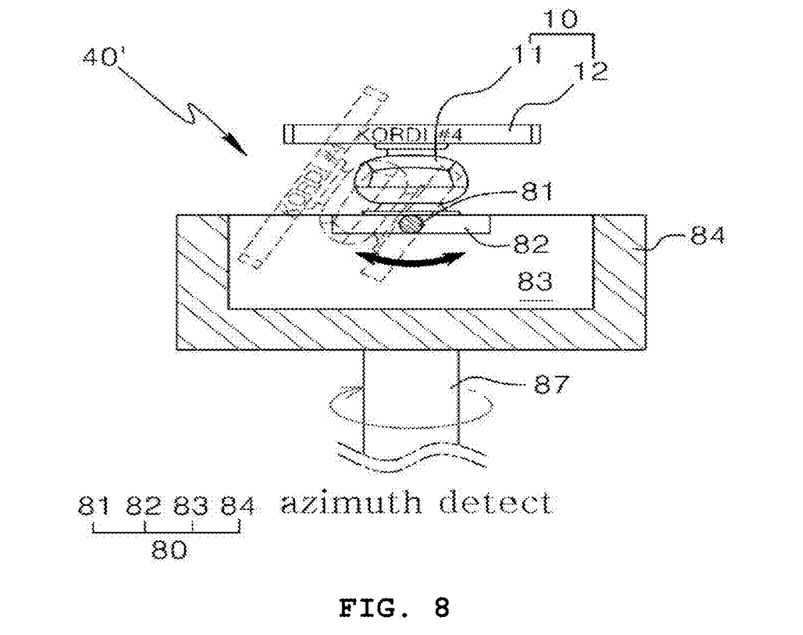
FIG. 8 is a configuration view showing an azimuth detect device according to another embodiment of the present invention.

Another type is an azimuth detect device (40') as illustrated in FIG. 8. The azimuth detect device (40') comprises an azimuth detect radar (10), a tilting member (80) for controlling the horizontal angle of the azimuth detect radar (10), and a horizontal rotation module (87) for rotating the azimuth detect radar (10) and the tilting member (80)).

The azimuth detect device (40) mentioned as the former is figured to include three azimuth detect radars (10) as illustrated in FIG. 6, the azimuth detect radar module (20) including the three azimuth detect radars (10) vertically sequentially aligned with a space with different azimuth detect angles from each other, and the azimuth detect rotation module (30) which supports and rotates the azimuth detect radars (10). A plurality of the azimuth detect radars (10) in the azimuth detect radar module (20) have identical configuration. The azimuth detect rotation module (30) includes brackets (31, 32, 33) for respectively supporting the three azimuth detect radars (10), and a rotation axis (35) for firmly fixing the brackets (31, 32, 33) and connected with a motor (not shown) to rotate the plurality of the azimuth detect radars (10) at the same time. In the former azimuth detect device (40), the azimuth detect radar (10) at the lower side is installed to set upward at an angle of 24° (degrees) in relation to a horizontal line, and the azimuth detect radar (10) at the upper side is installed to be slightly tilted by an angle of 4° (degrees) in relation to a vertical line. The azimuth detect radar (10) which is installed at the lower side with tilted as above is appropriate to detect the azimuth of vessels and WIG ships, and the azimuth detect radars (10) which are installed at the middle and upper sides with tilted as illustrated in FIG. 6 are appropriate to detect the azimuth of aircrafts. Therefore, the former azimuth detect device (40) is faster at detect speed than the latter azimuth detect device (40') because the azimuth detect radars (10) in the former azimuth detect device (40) detect an object while rotating within an angle ranges as illustrated in FIG. 6.

Figure 9:
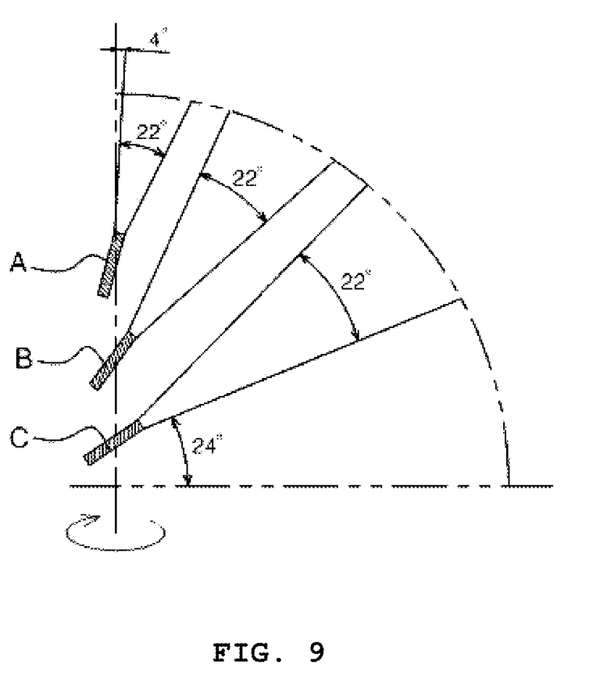
FIG. 9 is a configuration view showing a tilting angle of the azimuth detect radar of FIG. 8.

The latter azimuth detect device (40') as illustrated in FIG. 8 is configured such that one azimuth detect radar (10) is provided, a tilting member (80) is provided to adjust the horizontal angle of the azimuth detect radar (10), and a horizontal rotation module (87) is provided to rotate the azimuth detect radar (10) and the tilting member (80) at the same time. The tilting member (80) includes a main body (84) having a receiving part (83), a supporting part (82) for supporting and fixing the azimuth detect radar (10), a connection axis (81) for connecting the supporting part (82) to the main body (84) to change the horizontal angle of the supporting part (82), and a tilting module (not shown) for controlling the angle of the supporting part (82). The tilting member (80) is a normal one used to control the angle. The horizontal rotation module (87) rotates the tilting member (80) and the azimuth detect radar (10) safely set in the tilting member (80) at the same time. Thus, the azimuth detect radar (10) can be adjusted to set with any one selected angle among A, B, C angles in FIG. 9 through the tilting member (80). The horizontal rotation module (87) rotates the azimuth detect radar (10) when the azimuth detect radar (10) is adjusted to set with one selected angle among A, B, C angles, or rotates the azimuth detect radar (10) even while the angle is changed. The azimuth detect device (40') configured as above has the advantage being more efficient than the former azimuth detect device (40) when it is necessary to detect the azimuth only of a target object located in a specific angle, even though the azimuth detect speed may be slower than that of the former azimuth detect device (40).

Figure 7:
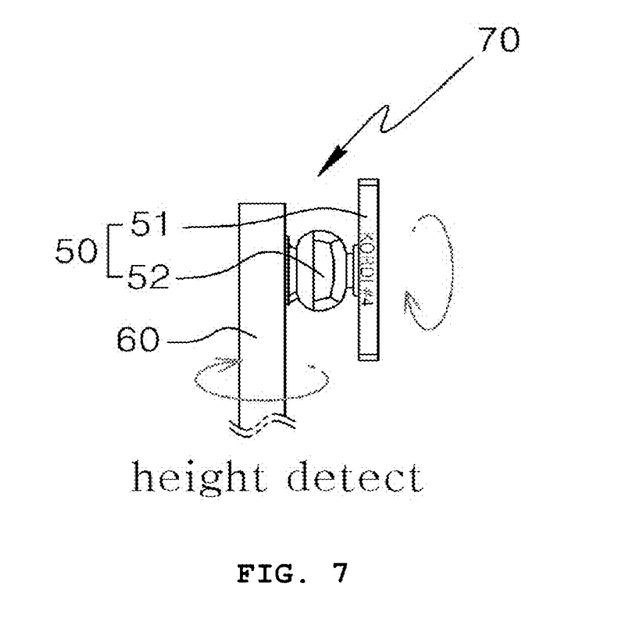
FIG. 7 is a configuration view showing a height detect device according to an embodiment of the present invention.

Meanwhile, the device for detecting an object in elevation will be referred to as a height detect device (70) hereinafter as illustrated in FIG. 7. The height detect device (70) is configured to include a height detect radar (50) vertically disposed for finding the height of a target object by emitting microwaves, and a height detect rotation module (60) for supporting and rotating the height detect radar (50). The height detect device (70) detects the altitude of a target object such as aircraft.

The azimuth detect radar (10) of the azimuth detect devices (40, 40') and the height detect radar (50) of the height detect device (70) are usual radars normally installed on vessels for air and sea surveillance with relatively low price (about 20~30 million won) with radiation ranges of 22°, rather such expensive radars as used in the air surveillance systems with high price (about 15~50 billion won) as illustrated in FIGS. 2 and 3. Therefore, according to the present invention, air and sea surveillance operation can be possible with a relatively low price by installing the normal radars for vessels as illustrated in FIG. 6 so as to detect target objects in the air and on the sea, and establish integrated air surveillance systems through building of the air surveillance networks in main areas and the connections between them, and maintain the management of the system with relatively low expenses. Further, the azimuth detect radar (10) includes an antenna (11) and a rotating part (12) for rotating the antenna (11). In the azimuth detect radar (10) according to the present invention, the antenna (11) is fixed not to be rotated by the rotating part (12). In the height detect radar (50) according to the present invention, an antenna (51) is set to be rotated by a rotating part (52).

Figure 5:
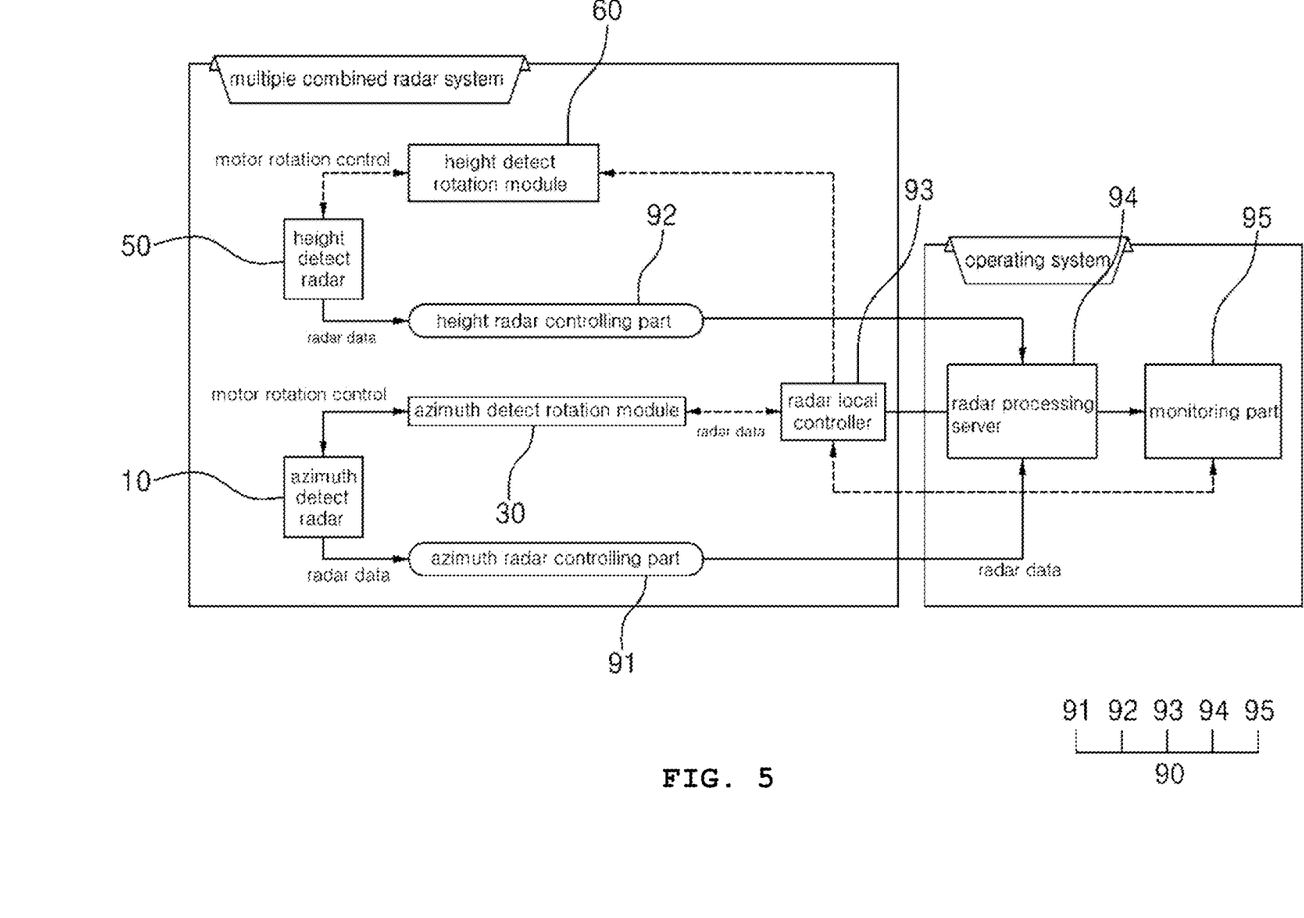
FIG. 5 is a configuration diagram showing a three-dimensional radar system using usual radars according to the present invention.

A control device (90) functions to control the azimuth detect devices (40, 40') and the height detect device (70). The control device (90) is also operated to set the height detect radar (50) to the azimuth of a target object by the height detect rotation module (60) in order to detect the height of the object after the azimuth detect device (40) detects the azimuth of the object. The configuration diagram of the control device (90) is illustrated in FIG. 5.

In detail, the control device (90) is operated such that when the azimuth detect radar (10) detects the azimuth of a target object while rotating by the azimuth detect rotation module (30), the detected azimuth data is sent to a radar processing server (94) by an azimuth radar controlling part (91), and the transmitted azimuth data is used in a monitoring part (95) and is also sent to a radar local controller (93). Then, the height detect rotation module (60) rotates the height detect radar (50) to be directed to the azimuth of the target object by the radar local controller (93). Then, the antenna (51) of the height detect radar (50) is rotated by the rotating part (52) so as to detect the altitude of the target object.

In the meantime, with the azimuth detect devices (40, 40') and the height detect device (70) installed on the sea facilities according to the present invention, it is more preferable to share the information data about target objects in the air and on the sea with other surveillance facilities on the sea by further employing a communication device in the system of the present invention capable of communicating with other sea facilities and sharing the information data about target objects in the air and on the sea each other. This is for the establishment of the air surveillance system networks in the main areas, and the establishment of the integrated air surveillance systems through the connection and communication of these surveillance system networks. The sea facilities include not only vessels and ships of navy and coast guards but also main facilities requiring safety and security in the port such as oil-refining facility and VTS center, etc. The communication device may be VHF communication.

As described above, according to the present invention, usual radars for vessels can be used for altitude detection and azimuth detection of a target object in the air and on the sea by the configuration of changing the installment angles of the usual radars for vessels, so as to provide advantages of enabling air surveillance operations at a relatively low price compared with the expensive air surveillance systems.

While the invention is described above with reference to the finite embodiments and drawings, the invention is not limited to the embodiments but can be modified and changed in various forms by those skilled in the art without departing from the technical concept of the invention and the equivalents of the appended claims.

Therefore, configurations described in the embodiments of the invention and shown in the drawings are only examples of the invention but do not represent all the technical spirit of the invention. Accordingly, it should be understood that various equivalents and modifications may be present at the time of filing the invention.

What is claimed is:

1. A three dimensional radar system using usual radars installed in sea facilities comprising:
    an azimuth detect device (40) comprising at least two azimuth detect radars (10) for detecting the azimuth of a target in the air and the sea by emitting microwaves, an azimuth detect radar module (20) including the azimuth detect radars (10) vertically sequentially aligned with a space with different azimuth detect angles from each other, and an azimuth detect rotation module (30) for supporting and rotating the azimuth detect radars (10);
    a height detect device (70) comprising a height detect radar (50) vertically provided and detecting the altitude of the target by emitting microwaves, and a height rotation module (60) for supporting and rotating the height detect radar (50); and
    a control device (90) for controlling the azimuth detect device (40) and the height detect device (70), wherein
    the control device (90) includes the operation of positioning the height detect radar (50) to detect the altitude of the target by using the height rotation module (60) after the azimuth detect device (40) detects the azimuth of the target.

2. The three dimensional radar system using usual radars installed in sea facilities according to claim 1, further comprising a communication device for communicating and sharing the information of the target in the air and the sea with other sea facilities with the azimuth detect device (40) and the height detect device (70) installed in a sea facility.

3. A three dimensional radar system using usual radars installed in sea facilities comprising:
    an azimuth detect device (40') comprising an azimuth detect radar (10) for detecting the azimuth of a target in the air and the sea by emitting microwaves, a tilting member (80) for controlling the horizontal angle of the azimuth detect radar (10), and a horizontal rotation module (87) for rotating the azimuth detect radar (10) and the tilting member (80);
    a height detect device (70) comprising a height detect radar (50) vertically provided and detecting the altitude of the target by emitting microwaves, and a height rotation module (60) for supporting and rotating the height detect radar (50); and
    a control device (90) for controlling the azimuth detect device (40') and the height detect device (70), wherein
    the control device (90) includes the operation of positioning the height detect radar (50) to detect the altitude of the target by using the height rotation module (60) after the azimuth detect device (40') detects the azimuth of the target.

4. The three dimensional radar system using usual radars installed in sea facilities according to claim 3, further comprising a communication device for communicating and sharing the information of the target in the air and the sea with other sea facilities with the azimuth detect device (40') and the height detect device (70) installed in a sea facility.

* * * * *